Patented Sept. 13, 1949

2,482,076

UNITED STATES PATENT OFFICE 2,482,076

PROCESS OF ISOMERIZING ISOMELAMINES

Jack T. Thurston, Riverside, Conn., assignor to American Cyanamid Company, New York, N. Y., a corporation of Maine No Drawing. Application March 9, 1945, Serial No. 581,943

7 Claims. (Cl. 260—249.5)

This invention relates to a method of preparing substituted-melamines by isomerization of substituted isomelamines.

I have discovered that mono-substituted-isomelamines having the formula:

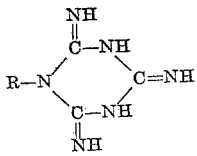

can easily be converted into normal melamines having the formula:

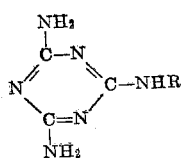

by merely heating the isomelamine in an hydroxylated organic solvent at temperatures of 80° C., or higher, in the presence of catalytic amounts of a strong basic substance. The yields, in many cases, approach theoretical.

The mono-substituted-isomelamines which may be isomerized in accordance with the present invention are new compounds but they may be prepared by reacting together a primary amine, a strong acid, and 1,3-dicyanoguanidine in the manner described and claimed in the copending application of Donald W. Kaiser and Daniel E. Nagy, Serial No. 554,155, filed September 14, 1944. Preparation of representative isomelamines will be described hereinafter.

Suitable isomelamines which may be prepared and converted into the corresponding normal melamines by the process of the present invention include phenylisomelamine, p-ethoxyphenylisomelamine, o-bromophenylisomelamine, 2,5-dichlorophenylisomelamine, o-hydroxyphenylisomelamine, m-nitrophenylisomelamine, p-nitrophenylisomelamine, p-arsonophenylisomelamine, 2-methyl-4-isopropylphenylisomelamine, o-tolylisomelamine, p-sulfonamidophenylisomelamine, alpha-naphthylisomelamine, p-aminophenylisomelamine and p-phenylenediisomelamine, p-sulfophenylisomelamine, butylisomelamine, ethylisomelamine, laurylisomelamine, beta-hydroxyethylisomelamine, and others of similar character. As will be apparent from the foregoing, R in the formula may be an aliphatic, cycloaliphatic, or aromatic radical.

The solvent, or organic liquid, in which the isomerization is carried out is an hydroxylated organic liquid, such as ethyl alcohol, butyl alcohol, isopropyl alcohol, amyl alcohol, octyl alcohol, ethylene glycol, the monoethyl ether of ethylene glycol and other mono-ethers of like character, glycerol, and the like. The preferred alcohols have a boiling point of at least 80° C. although those having a lower boiling point may be employed if the isomerization is conducted in pressure vessels. It is also preferred, but not necessary that the alcohol be a liquid so that the product may be easily separated therefrom by filtration or other known means. Dioxane and other inert solvents may be used as diluents for the alcohol if desired. The presence of substantial amounts of water in the reaction mixture is to be avoided as water tends to cause formation of side reaction products.

The catalytic agent is a strongly alkaline substance having a basicity at least that of the isomelamine to be isomerized. The isomelamines are moderately strong alkaline substances having a pH in aqueous solution above about 11. Suitable catalysts include sodium hydroxide, potassium hydroxide, sodium methoxide, potassium methoxide, sodium ethoxide, potassium ethoxide, and other alkali metal alkoxides and quaternary ammonium compounds such as benzyl trimethyl ammonium hydroxide.

The amount of catalyst may be quite small, ranging from about 0.1% to 10% or more, based on the weight of the isomelamine that is to be isomerized. In the event that the solvent contains acids, or acidic substances, or that acid salts of the isomelamines are used as starting materials, enough of the alkaline substance should be used to neutralize the acid or acid-forming substances present and provide an excess of the alkaline material for catalyzing the isomerization.

Although the isomerization will take place at a fairly good rate at 80° C. a much faster rate of isomerization is obtained at temperatures of 100° C. or higher. Actually, in most cases the temperature of the process will be governed by the refluxing temperature of the hydroxylated solvent chosen. Higher temperatures may be used if the reaction is carried out under pressure. The maximum temperatures depend, of course, upon the decomposition temperature of the solvent, the intermediate or product.

My invention will now be illustrated by means of the following examples in which representative isomelamines are isomerized to the corresponding normal melamine in the presence of different catalytic agents and in various solvents and solvent mixtures. It will be understood, of course, that these examples are merely intended to illustrate certain aspects of the invention which are not limited to the specific details described herein.

Example 1

Into a three-necked flask equipped with mechanical stirrer, reflux condenser, thermometer in liquid, dropping funnel, and dropper for removing samples, was placed a mixture of 21 cc. (0.21 mol) of butylamine and 100 cc. of Cellosolve (beta-ethoxyethanol) which had been neutralized with a portion of a mixture of 10 g. of sulfuric acid in 25 cc. Cellosolve. To this was added 46.8 g. (0.2 mol) of crude mono-potassium, 1,3-dicyanoguanidine and the flask heated with an oil bath. When the liquid temperature had reached 114° C. the rest of the acid was added at such a rate that a sample of the liquid remained faintly blue to bromthymol blue. Further acid (10 g. of sulfuric acid in 25 cc. Cellosolve) was added in this manner during the next half hour, during which time the temperature was gradually raised to 130° C. The liquid now no longer turned the indicator blue so the last portion of the acid was added very slowly during the next two hours. The vapors during this time were always alkaline.

After standing over night the solid was filtered, washed with acetone, and dried in an oven. The yield was 60 g. of white solid which was placed in 300 cc. of water, made alkaline with 20 cc. of 50% sodium hydroxide, stirred while in an ice bath, filtered, and washed with ice water. After drying in the vacuum desiccator there was obtained 28 g. or a 77% yield of butyl isomelamine which decomposed at 230–231° C.

To a solution of 0.3 g. of metallic sodium dissolved in 100 cc. of butanol was added 5 g. of butyl isomelamine. The mixture was heated under a reflux condenser for three hours during which time the butyl isomelamine dissolved in the hot butanol. The solution was then neutralized with acetic acid and the butanol evaporated under reduced pressure. The gummy solid, butylmelamine, which was obtained was recrystallized from hot water and was then found to have a melting point of 160–162° C. The mixed melting point with an authentic sample of butyl melamine was at the same temperature.

Example 2

To a solution of 0.4 g. (0.018 mol) of metallic sodium dissolved in 100 cc. of butanol was added 5 g. (0.0158 mol) of dodecyl isomelamine hydrochloride and the mixture refluxed for three hours. The excess alkali was then neutralized with acetic acid and the butanol removed under reduced pressure. The oil which remained gradually solidified and was then dissolved in methanol and precipitated by the addition of water. The dodecyl melamine which was obtained was recrystallized from methanol containing about 15% of water. Its melting point was found to be 110° C. The hydrochloride and acetate salts, as well as the free base, were found to be identical with corresponding derivatives made from a known sample of dodecyl melamine. No unreacted dodecyl isomelamine was noted, thus indicating a quantitative isomerization of the dodecyl isomelamine to dodecyl normal melamine.

Example 3

To a solution of 0.57 g. (0.026 mol) of sodium metal in 100 cc. of butanol was added 4.66 g. (0.0226 mol) of beta-hydroxyethyl isomelamine hydrochloride. The mixture was heated under a reflux condenser for three and a half hours with vigorous mechanical stirring. After the solution had been neutralized and the butanol removed under reduced pressure, the solid which was left was treated with 50 cc. of water containing 3 cc. of concentrated hydrochloric acid. The solution was then filtered and the filtrate was made alkaline whereupon a precipitate formed slowly. This product was found to soften at 225° C. and decompose at 270° C. It appeared to be beta-hydroxyethyl melamine with a small amount of the isomelamine. After filtering the solution again and allowing it to stand overnight, a small amount of pure beta-hydroxyethyl normal melamine precipitated. This product melted without decomposition at 223°–225° C. and was found to be identical with a known sample of the corresponding normal melamine which had been prepared by another method.

Example 4

In a three-necked flask, heated on a steam bath, and fitted with agitator, thermometer, reflux condenser and dropping funnel was placed 21.5 g. (0.22 mol) of aniline. To this was added 50 cc. of water, one-half of a diluted acid made by mixing 35 cc. concentrated hydrochloric acid with 100 cc. of water, and 29 g. (0.2 mol) of mono-potassium salt of 1,3-dicyanoguanidine. When the temperature had reached 92° C., the solution was clear and the rest of the diluted acid was added dropwise during the next one-half hour. Frequent tests with pH paper showed the pH remained in the region 3 to 4 until all but the last few ccs. of acid had been added. The formation of a mist of aniline hydrochloride at the tip of the acid dropping funnel also persisted until almost all of the acid had been added. The last few ccs. of acid were added slowly until the pH had dropped to about one and remained there for 5 minutes. The hot solution was filtered, cooled, the precipitated product filtered, washed with a little ice water and air-dried. The yield of crude phenylisomelamine hydrochloride was quantitative. After recrystallization from water, it decomposed at 318° C.

Phenylisomelamine was prepared by adding excess alkali to a water suspension of the hydrochloride.

To a solution of 0.5 g. of sodium metal in 350 cc. of butanol was added 100 g. of phenyl isomelamine. After heating under a reflux condenser for three hours the reaction mixture was cooled and normal phenyl melamine precipitated from solution. Comparison of the product with a known sample of normal phenyl melamine revealed the identity of the two. This isomerization gave 95% yields of the normal melamine.

Example 5

10 g. of para-arsonophenyl isomelamine was added to 50 cc. of methanol containing 0.735 g. of sodium. 60 cc. of Cellosolve (mono-ethyl ether of ethylene glycol) was then added and the mixture heated slowly until the methanol had distilled out and the liquid refluxed at 130° C. After heating one and half hours longer, the mixture was diluted to 200 cc. with water to form a clear solution. Acidification with acetic acid precipitated the insoluble, normal melamine in 74% yield.

Example 6

2 g. of para-nitrophenyl isomelamine was refluxed for three and a half hours in butanol containing a small amount of sodium butoxide. During this time the solution became red and the insoluble precipitate more granular. The filtered precipitate was washed with water and found to be insoluble in water, dilute hydrochloric acid, hot Cellosolve (mono-ethyl ether of ethylene glycol), and hot acetic acid. It was slightly soluble in hot dioxane containing a small amount of water from which solvent mixture it was recrystallized. The product, normal para-nitrophenyl melamine, melted at 318° C. and was obtained in good yields.

*Example 7*

About 1 g. of 2,5-dichlorophenyl isomelamine was suspended in 50 cc. of butanol which contained a catalytic amount of sodium butoxide. Upon refluxing, the isomelamine dissolved within a few minutes but refluxing was continued for three hours. The solution was then neutralized with acetic acid and the butanol evaporated to leave normal 2,5-dichlorophenyl melamine as a white solid, melting without decomposition at 223°–225° C.

*Example 8*

One pellet of KOH was dissolved in 50 cc. of butanol and 15 g. of phenyl isomelamine was then added. The mixture was refluxed for three hours, after which the solution was neutralized and the butanol evaporated. Normal phenyl melamine was obtained in an 80% yield.

*Example 9*

1 cc. of 50% solution of benzyltrimethylammonium hydroxide was dissolved in 50 cc. of butanol. 10 g. of phenyl isomelamine was then added and the mixture refluxed for four hours. The solution was then neutralized with acetic acid and the butanol removed by evaporation. Normal phenyl melamine was obtained with a yield of 82%.

*Example 10*

10 g. of phenyl isomelamine was dissolved in 50 cc. of the mono-ethyl ether of ethylene glycol and the solution refluxed for one and a half hours. After filtration and evaporation of the solvent, normal phenyl melamine was obtained with a yield of 60%.

What I claim is:

1. A method of preparing normal monosubstituted melamines having the formula

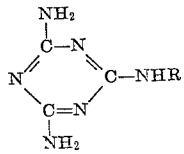

in which R is a radical of the group consisting of aliphatic and aromatic radicals which comprises heating together as the essential components a monosubstituted isomelamine having the formula

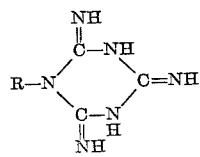

in which R is as defined above, an alcohol, and catalytic amounts of a strongly basic substance at temperatures of at least 80° C. until the isomelamine has been isomerized to a normal melamine, and recovering the thus formed normal monosubstituted melamine.

2. A method of preparing normal monosubstituted melamines having the formula

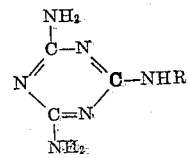

in which R is an aromatic radical which comprises heating together under substantially anhydrous conditions as the essential components a monosubstituted isomelamine having the formula

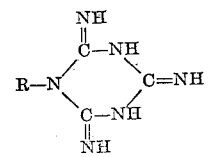

in which R is as defined above, an alcohol, and catalytic amounts of an alkali metal alkoxide at temperatures of at least 80° C. until the isomelamine has been isomerized to normal melamine and recovering the thus formed normal mono-aromatic-substituted melamine.

3. A method of preparing normal monophenyl melamine which comprises heating together as the essential components monophenyl isomelamine, an alcohol, and catalytic amounts of a strongly basic substance at temperatures of at lease 80° C. until the monophenyl isomelamine has been isomerized to normal phenyl melamine and recovering the thus formed normal monophenyl melamine.

4. A method of preparing normal monododecyl melamine which comprises heating together as the essential components monododecyl isomelamine, an alcohol, and catalytic amounts of a strongly basic substance at temperatures of at least 80° C. until the monododecyl isomelamine has been isomerized to normal dodecyl melamine and recovering the thus formed normal dodecyl melamine.

5. A method of preparing normal monosubstituted melamines having the formula

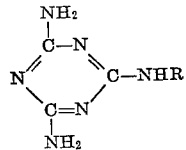

in which R is a radical of the group consisting of aliphatic and aromatic radicals which comprises heating together under substantially anhydrous conditions as essential components a monosubstituted isomelamine having the formula

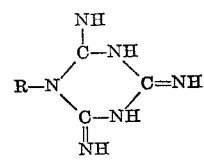

in which R is as defined above, an alcohol, and from 0.1 to 10% by weight based upon the weight of the said isomelamine of a basic substance at least as strongly basic as the said isomelamine until the isomelamine has been isomerized to a normal melamine, and recovering the thus formed normal monosubstituted melamine.

6. A method of preparing normal monosubstituted melamines having the formula

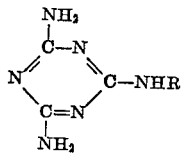

in which R is a radical of the group consisting of aliphatic and armoatic radicals which comprises heating together under substantially anhydrous conditions as essential components a monosubstituted isomelamine having the formula

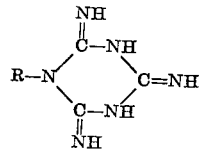

in which R is as defined above, butanol, and from 0.1 to 10% by weight based upon the weight of the said isomelamine of a basic substance at least as strongly basic as the said isomelamine until the isomelamine has been isomerized to a normal melamine, and recovering the thus formed normal monosubstituted melamine.

7. A method of preparing normal monosubstituted melamines having the formula

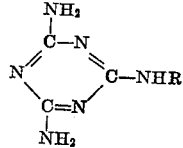

in which R is a radical of the group consisting of aliphatic and aromatic radicals which comprises heating together under substantially anhydrous conditions as essential components a monosubstituted isomelamine having the formula

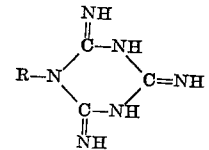

in which R is defined above, the monoethyl ether of ethylene glycol, and from 0.1 to 10% by weight based upon the weight of said isomelamine of a basic substance at least as strongly basic as the said isomelamine until the isomelamine has been isomerized to a normal melamine, and recovering the thus formed normal monosubstituted melamine.

JACK T. THURSTON.

REFERENCES CITED

The following references are of record in the file of this patent:

UNITED STATES PATENTS

| Number | Name | Date |
| --- | --- | --- |
| 2,197,357 | Widmer | Apr. 16, 1940 |
| 2,328,825 | McMahon | Sept. 7, 1943 |